(12) United States Patent
Denisart et al.

(10) Patent No.: US 7,604,826 B2
(45) Date of Patent: Oct. 20, 2009

(54) CLOSED CAPSULE WITH OPENING MEANS

(75) Inventors: Jean-Luc Denisart, Cully (CH); Antoine Cahen, Lausanne (CH); Alfred Yoakim, St-Légier-La Chiesaz (CH)

(73) Assignee: Nestec S.A., Vevey (CH)

( * ) Notice: Subject to any disclaimer, the term of this patent is extended or adjusted under 35 U.S.C. 154(b) by 510 days.

(21) Appl. No.: 10/875,279

(22) Filed: Jun. 25, 2004

(65) Prior Publication Data
US 2004/0228955 A1 Nov. 18, 2004

Related U.S. Application Data

(63) Continuation of application No. PCT/EP03/00384, filed on Jan. 13, 2003.

(30) Foreign Application Priority Data

Jan. 16, 2002 (EP) .................................. 02000943

(51) Int. Cl.
*A47J 31/00* (2006.01)
(52) U.S. Cl. .............................. 426/77; 426/78; 426/79; 426/112; 426/433; 426/115; 99/295; 99/323
(58) Field of Classification Search ............ 426/77–80, 426/112, 120, 433, 115; 99/282, 297, 295, 99/307, 232; 222/541.3, 541.2; 206/0.5
See application file for complete search history.

(56) References Cited

U.S. PATENT DOCUMENTS

| | | | | |
|---|---|---|---|---|
| 2,856,843 A | * | 10/1958 | Miklas | 99/282 |
| 3,292,527 A | | 12/1966 | Stasse | |
| 3,589,272 A | * | 6/1971 | Bouladon et al. | 99/295 |
| 3,607,297 A | | 9/1971 | Osvaldo | |
| 3,935,318 A | * | 1/1976 | Mihailide | 426/80 |
| 4,077,551 A | | 3/1978 | Manaresi | 222/494 |
| 4,136,202 A | | 1/1979 | Favre | |
| 4,306,492 A | * | 12/1981 | Zimmermann | 99/287 |
| 4,410,550 A | * | 10/1983 | Gaskill | 426/80 |
| 4,886,674 A | * | 12/1989 | Seward et al. | 426/79 |

(Continued)

FOREIGN PATENT DOCUMENTS

DE 2327264 1/1975

(Continued)

*Primary Examiner*—Drew E Becker
*Assistant Examiner*—Steven Leff
(74) *Attorney, Agent, or Firm*—K&L Gates LLP

(57) ABSTRACT

The present invention relates to a capsule containing a substance for the preparation of a beverage that is designed to be extracted by injection of a fluid under pressure. The capsule comprises a closed chamber containing the substance with at least part of the closed chamber including a retaining part made of a flexible membrane. One or more raised elements that face the membrane are associated with and forming part of the capsule. These element(s) are used to open the capsule due to a buildup of pressure therein. This rise in pressure causes relative engagement of the raised element(s) with the membrane until the membrane ruptures or is torn to release the formed beverage from the chamber. As the liquid of the beverage does not come into contact with the machine, hygiene is improved and cross-contamination is reduced when preparing a beverage from the capsule.

27 Claims, 15 Drawing Sheets

U.S. PATENT DOCUMENTS

| | | | |
|---|---|---|---|
| 5,259,295 A * | 11/1993 | Timm | 99/282 |
| 5,287,796 A | 2/1994 | Timm | 99/282 |
| 5,472,719 A | 12/1995 | Favre | |
| 5,656,311 A * | 8/1997 | Fond | 426/84 |
| 5,705,209 A * | 1/1998 | Wright et al. | 426/112 |
| 5,780,083 A * | 7/1998 | Wright et al. | 426/112 |
| 5,897,899 A * | 4/1999 | Fond | 426/112 |
| 6,948,420 B2 | 9/2005 | Kirschner et al. | |
| 2001/0048957 A1 | 12/2001 | Lazaris et al. | |
| 2005/0016383 A1 | 1/2005 | Kirschner et al. | |
| 2005/0183581 A1 | 8/2005 | Kirschner et al. | |
| 2005/0241489 A1 | 11/2005 | Kirschner et al. | |
| 2006/0196364 A1 | 9/2006 | Kirschner | |

FOREIGN PATENT DOCUMENTS

| | | |
|---|---|---|
| EP | 0 451 980 | 10/1991 |
| EP | 0 451 980 A2 | 10/1991 |
| EP | 512468 | 11/1992 |
| EP | 0521 186 | 1/1993 |
| FR | 2062337 | 6/1971 |
| FR | 2127329 | 10/1972 |
| FR | 262 0921 | 3/1989 |
| GB | 1 256 247 | 12/1971 |
| GB | 2 325 922 | 12/1998 |
| RU | 2 174 937 | 10/2001 |
| WO | WO 02081337 | 10/2002 |
| WO | 2005016094 | 2/2005 |

* cited by examiner

CLOSED CAPSULE WITH OPENING MEANS

CROSS-REFERENCE TO RELATED APPLICATIONS

This application is a continuation of International Application PCT/EP03/00384 filed Jan. 13, 2003, the entire content of which is expressly incorporated herein by reference thereto.

BACKGROUND ART

The present invention relates to a capsule designed to be extracted under pressure and containing a substance for the preparation of a food product such as a beverage.

Cartridges designed to be extracted under pressure and containing a substance for the preparation of a beverage already exist on the market. European Patent Application EP 0512468 relates to such a cartridge. The cartridge is intended to be inserted into an extraction system. The cartridge is thus opened against a supporting part of the system comprising raised elements under the effect of the pressure of the fluid entering the cartridge. The problem with this cartridge is that the beverage extracted from the cartridge runs over this supporting part and through ducting means, which means that it is difficult, if not impossible, for contamination and taste reasons, to envisage extracting with this system cartridges containing substances other than roasted ground coffee, because of the beverage residue present on the support.

British patent application GB 1 256 247 relates to a cartridge containing a substance suited for the preparation of a beverage. This cartridge is opened by deforming the lid of the cartridge using an external piston that collaborates with an internal puncturing element. This system is complicated to use in order to open the capsule at the correct moment.

The purpose of the present invention is to make available to the consumer a capsule which does not have this disadvantage, that is to say a capsule which can contain a wide variety of substances to be extracted as needs be, and which allows preparation and outflow of the beverage without there being a need for the beverage at any time to come into contact with part of the system.

SUMMARY OF THE INVENTION

The present invention relates to a capsule containing a substance for the preparation of a beverage that is designed to be extracted by injection of a fluid under pressure. The capsule comprises a closed chamber containing the substance and opening means associated with and forming part of the capsule for allowing the capsule to be opened at the time of its use due to a buildup of pressure therein due to the injected fluid to rupture part of the chamber for allowing the prepared beverage to flow out and be dispensed.

Advantageously, the closed chamber comprises a retaining part made of a flexible membrane and the opening means comprises one or more opening element(s), in particular in the form of more raised elements that face the membrane, such that opening of the capsule is achieved by relative engagement of the raised element(s) with the retaining part of the closed chamber with the relative engagement being performed under the effect of the rise in pressure of the fluid in the closed chamber.

The opening means may be housed inside the closed chamber and the one or more raised elements are urged against the membrane due to the rise in pressure of the fluid in the chamber, or the opening element(s) may be housed outside the closed chamber and the membrane of the retaining part is moved against the opening means by the rise in pressure in the chamber. In preferred embodiments, the raised element(s) include at least one puncturing element, and the membrane is a thin film that can be punctured by the puncturing element.

The invention also relates to methods of use of these new capsules. In one embodiment, the invention relates to a method for preparing various beverages in an extraction machine, wherein the liquid of the beverage does not come into contact with the machine and the capsule is supported from beneath by an element of the machine. The invention relates to a method for improving hygiene and reducing cross-contamination in the preparation of a beverage from a capsule containing a food substance in a closed chamber. As the capsule incorporates its own opening device, a fluid is introduced under pressure into the capsule causes the pressure to build to a certain level, with the opening device being activated to open the capsule and release the beverage. Generally, the opening device is activated by the effect of the internal pressure that becomes established within the closed chamber due to injection of the fluid therein. The various structures disclosed herein enable these methods to be carried out successfully.

BRIEF DESCRIPTION OF THE DRAWINGS

The invention is more clearly understood in connection with the appended drawing figures wherein.

DETAILED DESCRIPTION OF THE PREFERRED EMBODIMENTS

Figure 1:
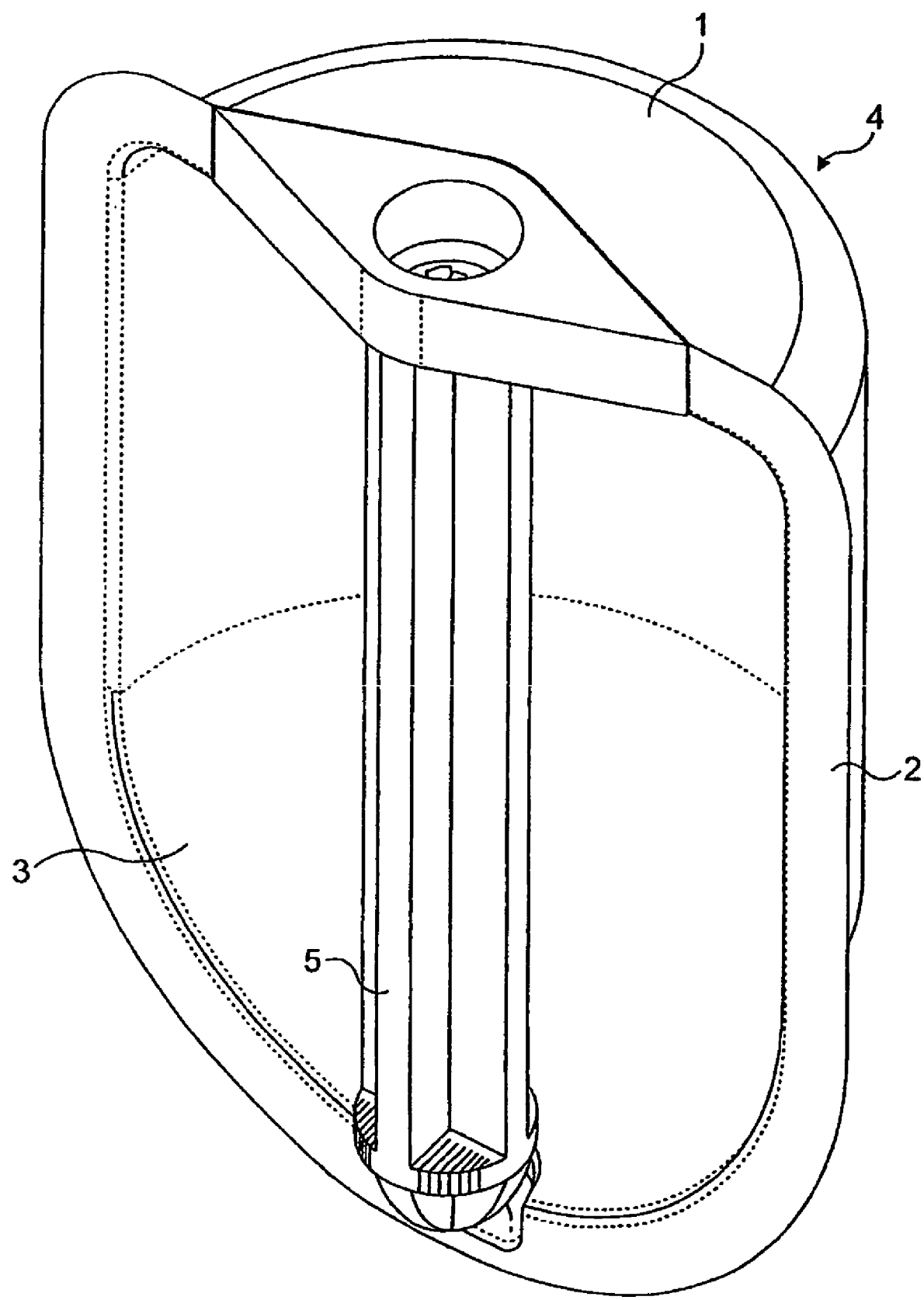
FIG. 1 is a perspective view of the closed capsule according to the first embodiment of the invention.

As noted above, the present invention relates to a capsule designed to be extracted by injection of a fluid under pressure in an extraction device, containing a substance for the preparation of a beverage, comprising a closed chamber containing the substance and an opening means, generally in the form of one or more elements, for allowing the capsule to be opened at the time of its use and for allowing the beverage to flow out of the capsule.

One of the principles of the present invention lies in the fact that each capsule comprises its own opening means activated by the rise of pressure of the fluid introduced into the capsule at the time of its extraction. Another principle of the invention lies in the fact that the capsule has its own outflow passage with its own ducting means making it possible to avoid, or at the very least considerably reduce, contact with the elements of the system or of the extraction device.

A result of these principles, taken alone or in combination, is that it is possible one after the other, to extract substances of different types or varieties without prejudice to the taste and without the risk of cross-contamination. The capsules can thus contain substances of very diverse nature and/or variety capable of being extracted or dissolved in water. It is thus possible to envisage any substance that is infused and any soluble substance: it must be clearly understood that both for extraction or for infusion or dissolution, the liquid element is hot, cold or warm water.

A configuration in which the opening means are specific to the capsule also has the advantage that each opening can be tailored and adjusted to suit the nature and/or the variety of the substance to be extracted. In other words, depending on the substance, opening may occur at different pressures and different times in order to achieve an optimum result.

As a preference, opening is achieved by relative engagement of the opening means with a retaining part of the closed chamber. The relative engagement of the opening means and of the retaining part is thus performed under the effect of the rise in pressure of the fluid in the chamber. The expression "relative engagement" is to be understood as meaning: either the opening means or the retaining part of the closed chamber, or alternatively both can be moved one with respect to the other to effect opening.

In a first principle, the opening means may be housed inside the closed chamber and thus be moved by thrust under the effect of the rise in pressure of the fluid in the chamber against the retaining part of the chamber.

In a second principle, the opening means may be housed outside the closed chamber and the retaining wall is then moved under the effect of the rise in pressure against the opening means. In this case, the means may be housed in the capsule but outside the chamber containing the substance.

The closed chamber of course has to be understood from the closed main part of the capsule that contains the substance to be extracted.

As a preference, the opening means is an element comprising at least one puncturing element. The opening means may thus form a surface comprising a multitude of puncturing elements. Such a configuration is preferred because such a surface acts as a pressure-spreading means and has the effect of allowing the pressure of the fluid to rise sufficiently inside the capsule before puncturing occurs: it is important to reach this pressure in order for the substance to be extracted and a good-quality beverage to be formed. As another preference, the retaining wall is a thin film (or lid) able to be punctured. The retaining wall contributes to closing the chamber just like other elements forming the container for the substance to be extracted, such as a cup or other elements. The wall may be a film or a membrane.

The opening element(s) and the retaining wall are defined and arranged, one with respect to the other, in such a way that opening occurs in a determined pressure range, preferably at a given pressure corresponding to the optimum extraction pressure. The extraction pressure may vary from 4 to 8 bar, more preferably, of the order of 6 bar. The optimum pressure may vary according to the substances to be extracted.

The capsule of the invention advantageously also has a means for the collection and outflow of the beverage.

Such a means has the purpose of directing the stream or streams of beverage leaving the capsule towards the container, such as a mug, and of thus avoiding any contact with part of the system. The collection and outflow means preferably comprises a part of widened cross section covering the retaining part of the chamber followed by a part of narrowed cross section that concentrates the beverage into one or several favored directions. The parts of widened and narrowed cross section may form one and the same continuous portion that flares from the retaining part towards one or more outlets of the capsule. Such a portion may, for example, be a cup portion of concave internal shape directed downwards, which end in at least one outlet hole.

There are various embodiments of the closed capsule according to the invention. According to a first embodiment of the capsule according to the invention, the closed chamber comprises two welded half-shells, symmetric or otherwise, and the opening element is a rod arranged between the shells, the rod comprising at least one opening, preferably several openings, towards the top or at its upper end for the entry of water and, towards the bottom, or at its lower end, a shape allowing the weld of the two half-shells to be punctured as the capsule is placed in its extraction device, the shape also forming a filter. The rod preferably has a pointed shape. To extract from such a capsule, the extraction device may simply have a shower head for the arrival of water and a system allowing the rod to move inside the capsule so as to open the capsule and thus allow the liquid to flow out into the mug arranged under the extraction device. It is necessary that there be a filter element in the pointed part of the rod so as to prevent the coffee grounds from passing into the mug.

Of course, for all the embodiments, the capsule contains a certain quantity of substance for one mug, or two, or more: the quantity may preferably vary between 4 and 30 g.

In a second embodiment of the capsule according to the invention, the closed chamber comprises a cup and a membrane welded to the periphery of the cup and the opening element is arranged in the bottom of the cup and comprises a disc with a puncturing element(s) for puncturing the bottom of the cup through the rise in pressure inside the chamber at the time of extraction. During insertion of the capsule in the extraction system, it is necessary to have one or more sprinkling elements which puncture the membrane and allow water to enter the capsule, so as to pre-wet the coffee or other substance, so that the pressure in the capsule can rise and therefore cause the disc to move from a convex position to a concave position, this moving the puncturing element(s) which thus puncture(s) the bottom of the cup. The disc of this capsule has a sealing role and at the time of puncturing, the underside of the disc has means allowing the substance to be filtered for the passage of the desired beverage.

The puncturing element(s) may have any possible shape, for example points, blades, knives, needles and the like. Furthermore, the sprinkling elements may be in the form of blades, points, knives, needles and the like.

In a third embodiment of the capsule according to the invention, the capsule comprises a cup and a membrane welded to the periphery of the cup and the opening element is arranged on the membrane and consists of an element with a puncturing element(s) for puncturing the membrane through the rise in pressure inside the chamber. By comparison with the previous embodiment, instead of arranging the opening element(s) in the cup, these element(s) are arranged in the membrane, but the opening process remains the same, namely that the puncturing element(s) will puncture the membrane instead of the cup. The disc will still have a sealing function and will comprise filtering means.

In a fourth embodiment, the capsule comprises a cup with a rim and a bottom having an opening for the outflow of the beverage and a membrane welded to the periphery of the rim of the cup and the opening element is arranged in the bottom of the cup and includes puncturing element(s) covered by a thin film, this thin film opening on the puncturing element(s) at the time of extraction. The puncturing element(s) also have a filter function. In this embodiment, the puncturing element(s) remains fixed, and it is the thin film that deforms under pressure and opens on the aforementioned puncturing element(s). Just as in the previous embodiment, it is necessary to have one or more sprinkling elements to puncture the membrane, so as to pre-wet the coffee and have a rise in pressure in the capsule, so that the thin film is deformed and thus tears on the puncturing element(s). The capsule is of substantially circular cross section. The diameter of the means allowing the opening of the capsule is non-critical. The capsule according to this embodiment typically has a ratio of diameter of the means allowing opening to the diameter of the capsule of between 1:6 and 1:1.

In this embodiment, there are two options. The first is for the element allowing opening to be a separate piece, arranged in the bottom of the cup; this piece comprises a flat part with the puncturing element(s) and a fairly curved face pressing against the bottom of the cup. The puncturing element(s) are non-critical and may be blades, points, knives, needles, recessed and raised elements of cone-shape, pyramid-shape or any other geometry. The second option is for the opening element to consist of a disc with recessed and raised elements, the disc being placed on a rim of the bottom of the cup, the bottom having, substantially at its middle, an opening for the outflow of the beverage. The recessed and raised elements may be of cone-shape, pyramid-shape or any other geometry.

In the fifth embodiment, the capsule comprises a cup with a rim and a bottom having an opening for the outflow of the beverage and a membrane welded to the periphery of the rim of the cup and the opening element(s) include recessed and raised elements forming the bottom of the cup covered by a thin film, this thin film opening on the raised and recessed elements at the time of extraction. The thin film also has a filter function. In this embodiment, the recessed and raised elements remain fixed, and it is the thin film that deforms under the pressure and opens on the aforementioned recessed and raised elements. Just as in the previous embodiment, it is necessary to have one or more sprinkling elements to puncture the membrane, so as to pre-wet the coffee and have a rise in pressure in the capsule so that the thin film is deformed and thus tears on the recessed and raised elements. The capsule is of substantially circular cross section. The diameter of the opening element(s) of the capsule is non-critical. The capsule according to this embodiment normally has a ratio of the diameter of the means allowing opening to the diameter of the capsule of between 1:6 and 1:1. In this embodiment, the recessed and raised elements form the bottom of the capsule. The recessed and raised elements are non-critical and may be of diverse geometric shape, for example of cone-shape, pyramid-shape or any other geometry.

In a sixth embodiment, the capsule comprises a cup and a membrane welded to the periphery of the cup and having an opening for the outflow of the beverage and the opening element is arranged in a housing at the center of the membrane and includes an element with puncturing element(s) covered by a thin film, the thin film tearing on the puncturing element(s) at the time of extraction. These puncturing element(s) also have a filter function. By comparison with the previous embodiments, instead of having the opening element in the bottom of the cup, it is arranged at the center of the membrane. The extraction process remains the same: the sprinkling means puncture the top of the cup, the coffee is pre-wetted, the pressure rises inside the capsule and the thin film is deformed and opens on the puncturing element(s). The beverage flows into the container arranged under the capsule.

In another embodiment of the previous solution, the capsule comprises two welded half-shells containing the substance to be extracted, one having an opening for the outflow of the beverage, and the opening element is arranged in the half-shell with the opening and consists of a disc with puncturing element(s) covered by a thin film, the thin film opening on the puncturing element(s) at the time of extraction. The puncturing element(s) are the same as those mentioned hereinabove.

In a seventh embodiment of the capsule according to the invention, the capsule comprises a cup and a disc welded to the periphery of the cup, and having an opening for the outflow of the beverage and the capsule further comprises opening element(s) comprising a thin film welded between the disc and the cup and raised elements on the disc collaborating at the time of extraction with the thin film to allow the opening of the thin film through the rise in pressure and allowing the beverage to flow out directly into a cup or mug. In this case too, in order to extract the capsule, it is necessary to have an extraction device comprising one or more sprinkling elements for the arrival of the water. In a preferred embodiment, the raised elements consist of an annular element around the entire periphery of the disc. In this last embodiment it is necessary for the disc always to be supported by a support element in order to allow the thin film to open.

In this embodiment, if the substance for the preparation of the beverage is a soluble substance, the thin film alone is sufficient to retain the soluble substance therein. If the substance is insoluble, it is often necessary to provide, in the capsule and across the path taken by the beverage, such as under the thin film for example, a filter that will hold the substance therein. The material of the filter may be chosen from the group consisting of filter paper, woven fibers and nonwoven fibers. The fibers may be made of PET (polyethylene terephthalate) or PP (polypropylene) or some other suitable polymer.

In the last case, the annular element of the disc may be continuous or discontinuous. In the case of the embodiment of the discontinuous annular element, the disc comprises, between the annular elements, ribs directed towards the center of the disc.

It must be clearly understood in all the embodiments of the capsule according to the invention, that each capsule comprises means for collecting and for the outflow of the beverage. Such a means may be formed of a flow duct, so that the prepared beverage does not touch the elements of the extraction machine. The position of this duct is non-critical; it is preferably arranged substantially at the center of the capsule.

The flow duct is advantageously formed of part of the cup and forms an integral part thereof. The duct may have a concave internal shape allowing the beverage passing through or along the edges of the opening means to be collected. The shape of the capsule is non-critical also. The capsule preferably has a substantially circular shape.

It is possible to have a positionable or non-positionable capsule. A positionable capsule is understood to mean one which is not symmetric along its welding plane (referring for example to FIG. 17) and which may or may not be symmetric along its vertical axis (still in relation to FIG. 17). A non-positionable capsule is one that is symmetric along its welding plane and symmetric along its vertical axis.

The closed chamber comprises either half-shells or a cup and a membrane, or a cup and a disc. As the case may be, the material of the closed chamber is preferably chosen from the group consisting of aluminum, a plastic/plastic composite, a paper/plastic/paper composite, single-layer or multi-layer plastic. The plastic used is a plastic that is compatible in the sphere of foods and chosen from the group consisting of EVOH, PVDC, PP, PE, PA, in a single layer or as a multilayer. The thickness of material used is between 5 and 100 microns depending on the type of material used.

The puncturing means for the fourth to seventh embodiments are the same as those mentioned hereinabove.

In embodiments 4 to 7, the capsule comprises a thin film. This thin film is made of a material that is the same as that of the closed chamber.

The substance for the preparation of a beverage is chosen from the group consisting of roasted ground coffee, tea, instant coffee, a mixture of roasted ground coffee and instant coffee, a syrup concentrate, a fruit extract concentrate, a chocolate product, a milk-based product or any other dehydrated edible substance, such as dehydrated stock. It is possible according to the invention with equal ease to prepare a cold, hot or warm beverage.

As already mentioned hereinabove, the great benefit of the capsule according to the invention is that it comprises, on the one hand, its own opening means and, on the other hand, that it allows, with the same extraction machine, to envisage the possibility of extracting substances of different types and/or varieties such as a coffee, followed by a tea, without the consumer when consuming the beverage noticing an aftertaste resulting from the previous extraction. The benefit also stems from the cleanliness that the extraction affords. This means that each capsule has its own outflow that does not dirty the extraction machine. The result of this is less or no cleaning of the machine, greater food safety and hygiene reducing the risks of contamination or proliferation of micro-organisms in the machine and finally the possibility of extracting bacteriologically more sensitive substances such as milk powder or other substances with a neutral or weakly acidic pH.

The invention also relates to a process for the preparation of various beverages in a same machine, in which the liquid of the beverage does not come into contact with the machine and the capsule is supported from beneath by an element of the machine. It is also possible that the capsule according to the invention to perform extractions at lower pressures, namely at pressures under 10 bar. The invention also relates to a method for improving hygiene and reducing cross-contamination in the preparation of a beverage from a capsule containing a food substance in a closed chamber, with the capsule incorporating its own opening device, wherein a fluid is introduced under pressure into the capsule and that, once the pressure inside the capsule reaches a certain level, the opening device is activated to open the capsule and release and dispense the beverage. The opening device is preferably activated by the effect of the internal pressure that becomes established within the closed chamber.

Figure 2:
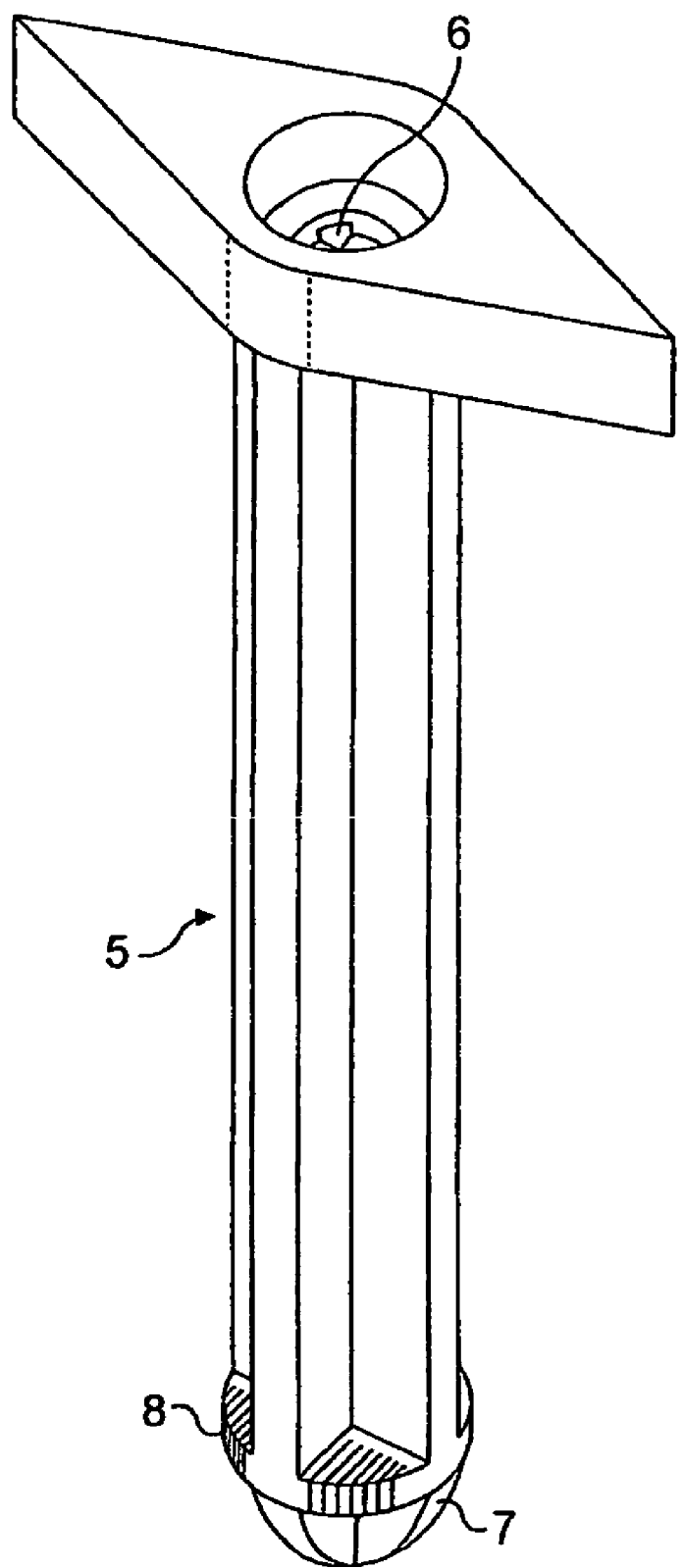
FIG. 2 is a perspective view of the rod of the capsule according to the first embodiment.

Referring now to the drawing figures, FIG. 1 clearly shows a half-shell (1), the second half-shell, not depicted, is welded along the welding line (2) and thus closes the capsule (4). This capsule has a housing (3) in which the substance for extraction, for example roasted ground coffee lies. The rod (5) is arranged between the two symmetric half-shells. This rod is depicted in FIG. 2 and in its upper part has holes (6) through which the hot water arrives for the preparation of the coffee. This rod further comprises, on its lower part, a pointed shape (7) for puncturing the weld of the two half-shells. The pointed part further comprises openings (8) to allow the coffee to pass through freely but to prevent the grounds from passing. When the capsule is introduced into its extraction system, the rod is pushed downwards so that the pointed shape (7) punctures the weld of the two half-shells.

Figure 3:
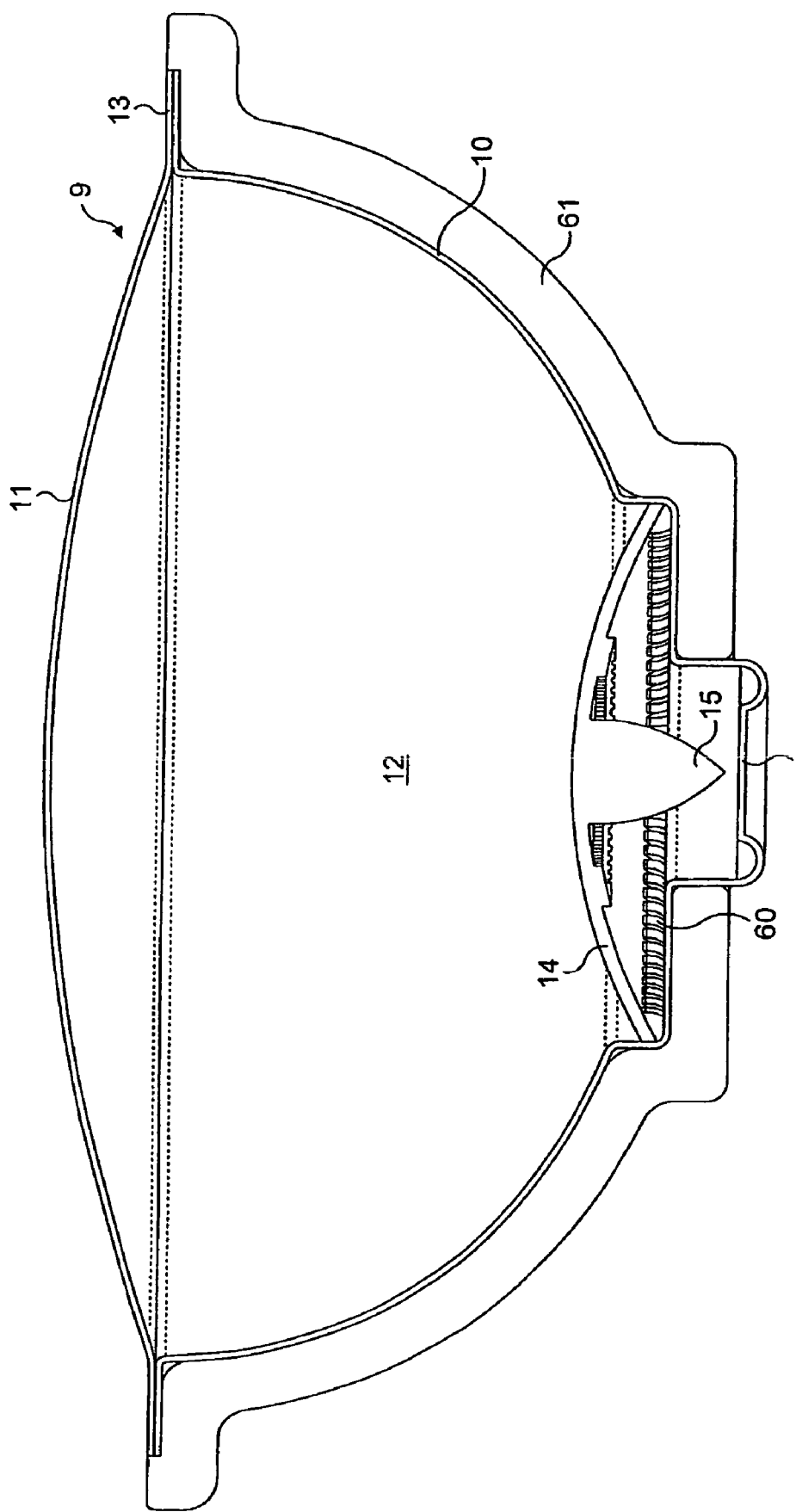
FIG. 3 is a schematic sectioned view of the capsule according to the second embodiment.

FIG. 3 shows a capsule (9) in the second embodiment of the invention. This capsule comprises a cup (10) and a membrane (11) welded at a peripheral welding edge (13) forming the periphery of the cup. The capsule contains a substance (12). The system for opening the capsule consists of a disc (14) arranged in the bottom of the cup (10) and comprising a puncturing point (15) and a filter (60). The puncturing point is therefore enclosed in the chamber formed by the cup (10) and the membrane (11). The disc is thus arranged at the bottom of the cup and thus forms a wider area over which the internal pressure may be spread during extraction. At the time of extraction, the capsule is introduced into the extraction device, water is introduced via a needle which punctures the membrane (11), and under the effect of the rise in pressure in the capsule, the disc (14) experiences a downward thrust towards the retaining part (16) so that the point (15) punctures the retaining part (16) of the cup, thus allowing the beverage to flow out. The capsule is held firmly in place by virtue of the support (61) and the filter (60) prevents the coffee grounds from passing into the mug (not depicted) situated under the capsule.

Figure 4:
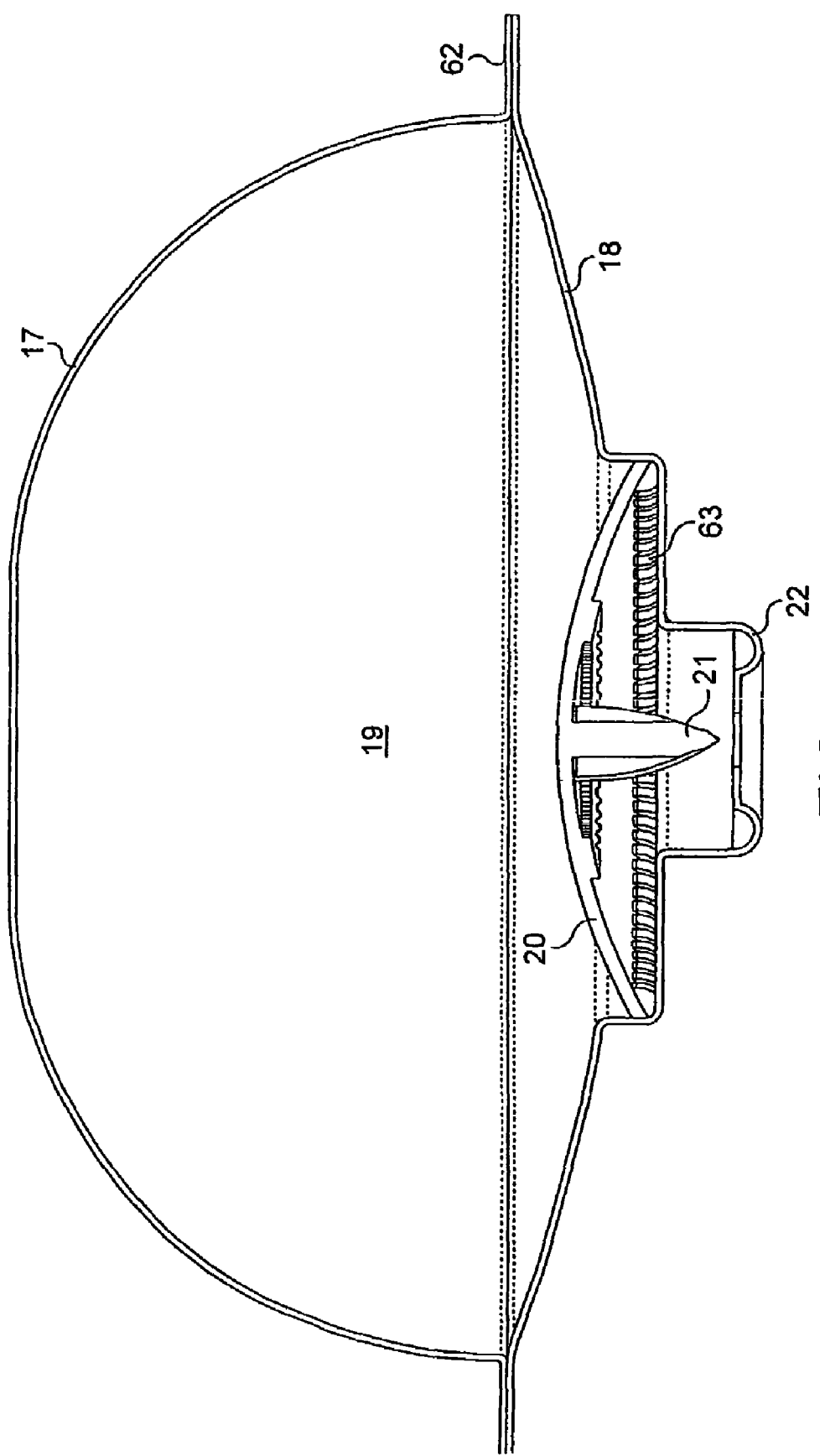
FIG. 4 is a schematic sectioned view of the capsule according to the third embodiment.

FIG. 4 shows another embodiment. The difference from the preceding figure is simply that instead of arranging the opening system in the cup, it is arranged in the membrane. The capsule comprises a cup (17) and a membrane (18) welded to the periphery of the cup at (62). The substance to be extracted (19) is in the capsule. The disc (20) constituting the opening system has a puncturing point (21) and a filter (63). At the time of extraction, the rise in pressure in the capsule means that the disc (20) experiences a downward thrust towards the retaining part (22) and the point (21) punctures the retaining part (22) of the membrane. The filter (63) allows the coffee grounds to be held back.

Figure 5:
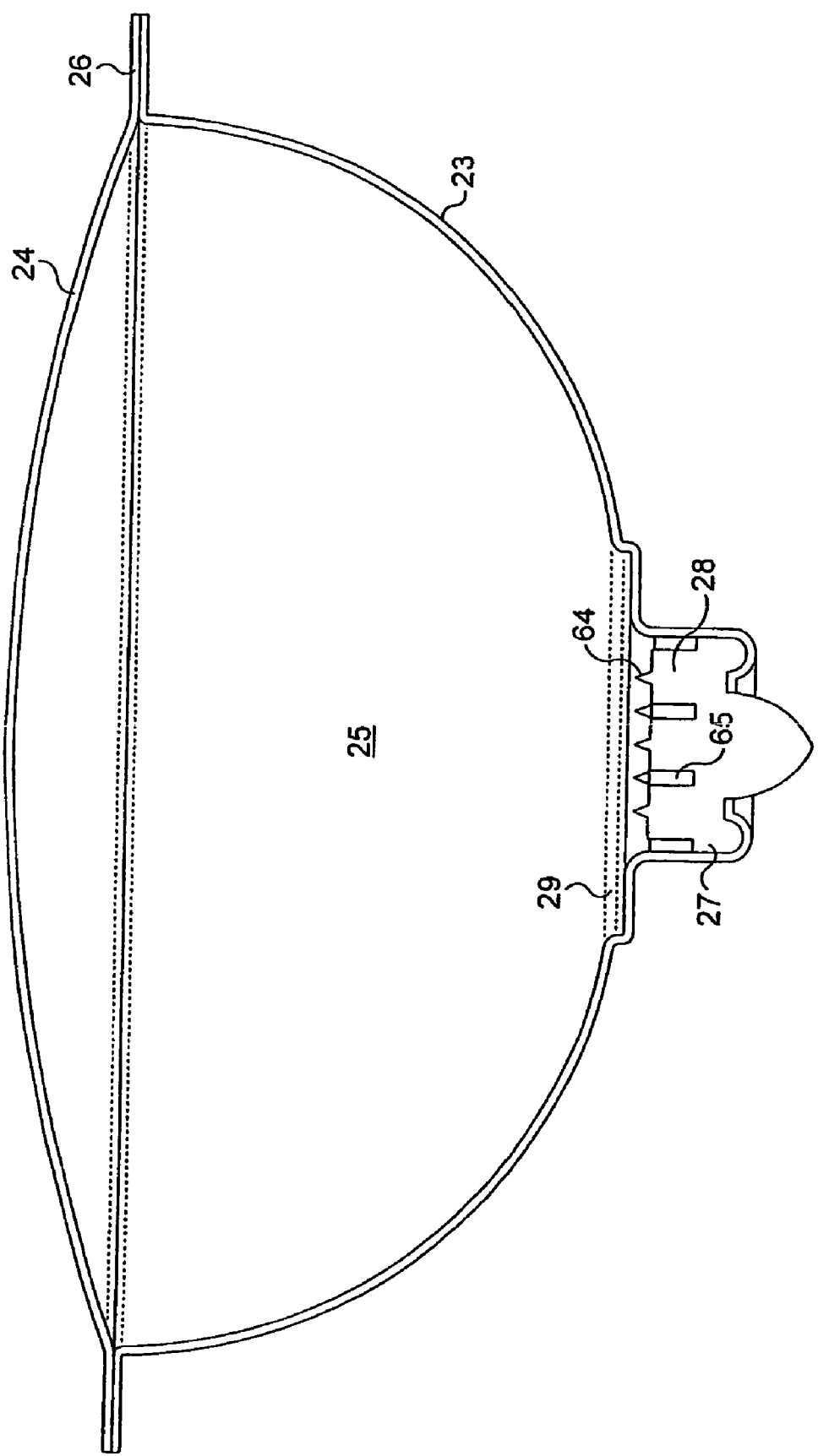
FIG. 5 is a schematic sectioned view of the capsule according to the fourth embodiment (first option)

FIG. 5 shows the capsule according to the invention in its fourth embodiment. This capsule comprises a cup (23) and a membrane (24) welded along a peripheral welding edge (26) to the periphery of the cup. The capsule contains a substance to be extracted (25). The means allowing opening is arranged in a housing (27) at the bottom of the cup. This means consists of an element (28) with puncturing means covered by a thin film (29). The puncturing means are points (64) directed towards the thin film. As in the previous embodiments, the water is introduced through the membrane and the rise in pressure will press the thin film (29) against the puncturing means so as to tear the thin film and the beverage can thus flow out into a mug arranged beneath. The element (28) thus has a filter function and for this purpose has a number of holes (65) for the passage of the beverage.

Figure 6:
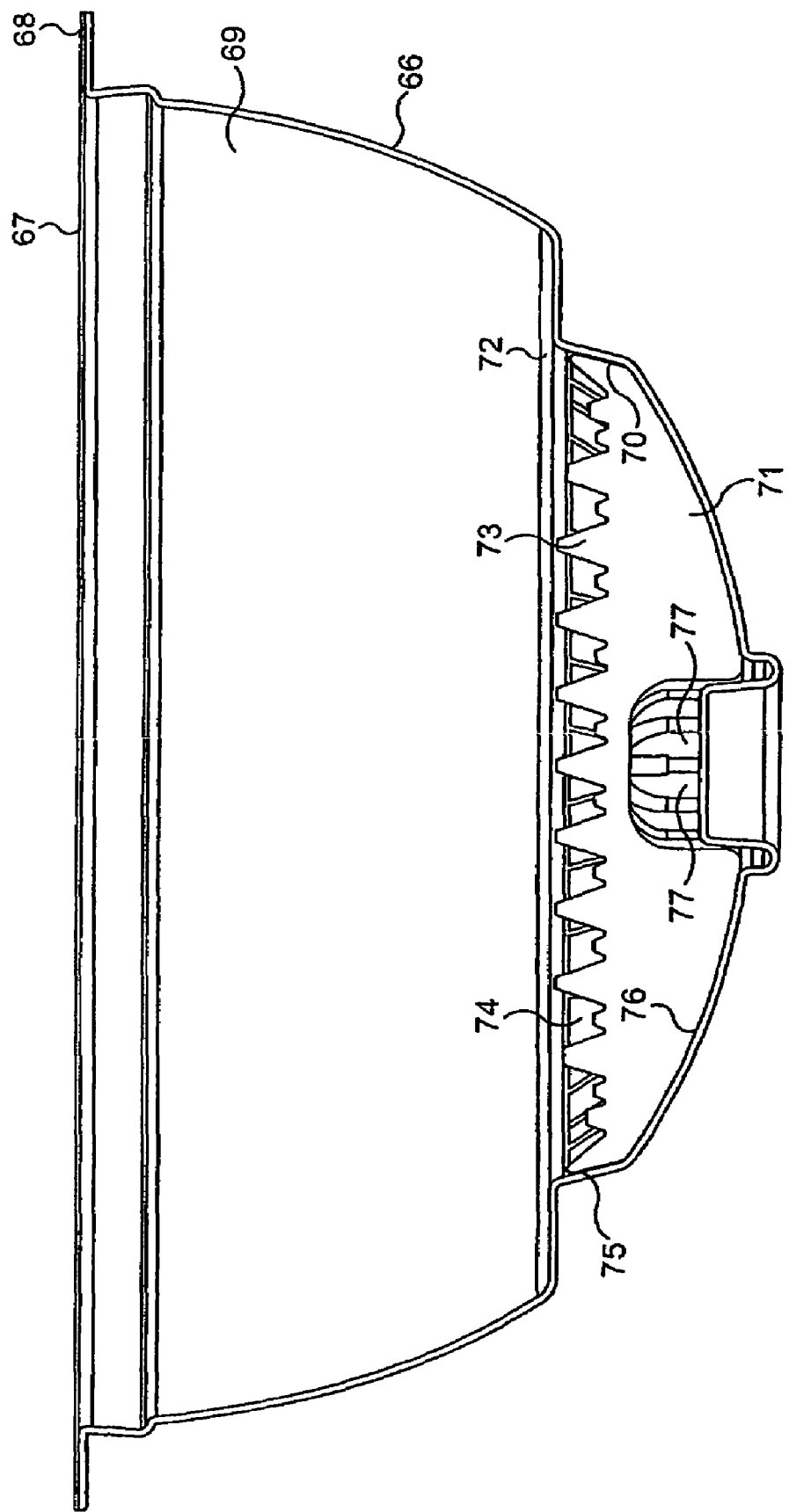
FIG. 6 is a schematic sectioned view of the capsule according to the fourth embodiment (first option)
Figure 7:
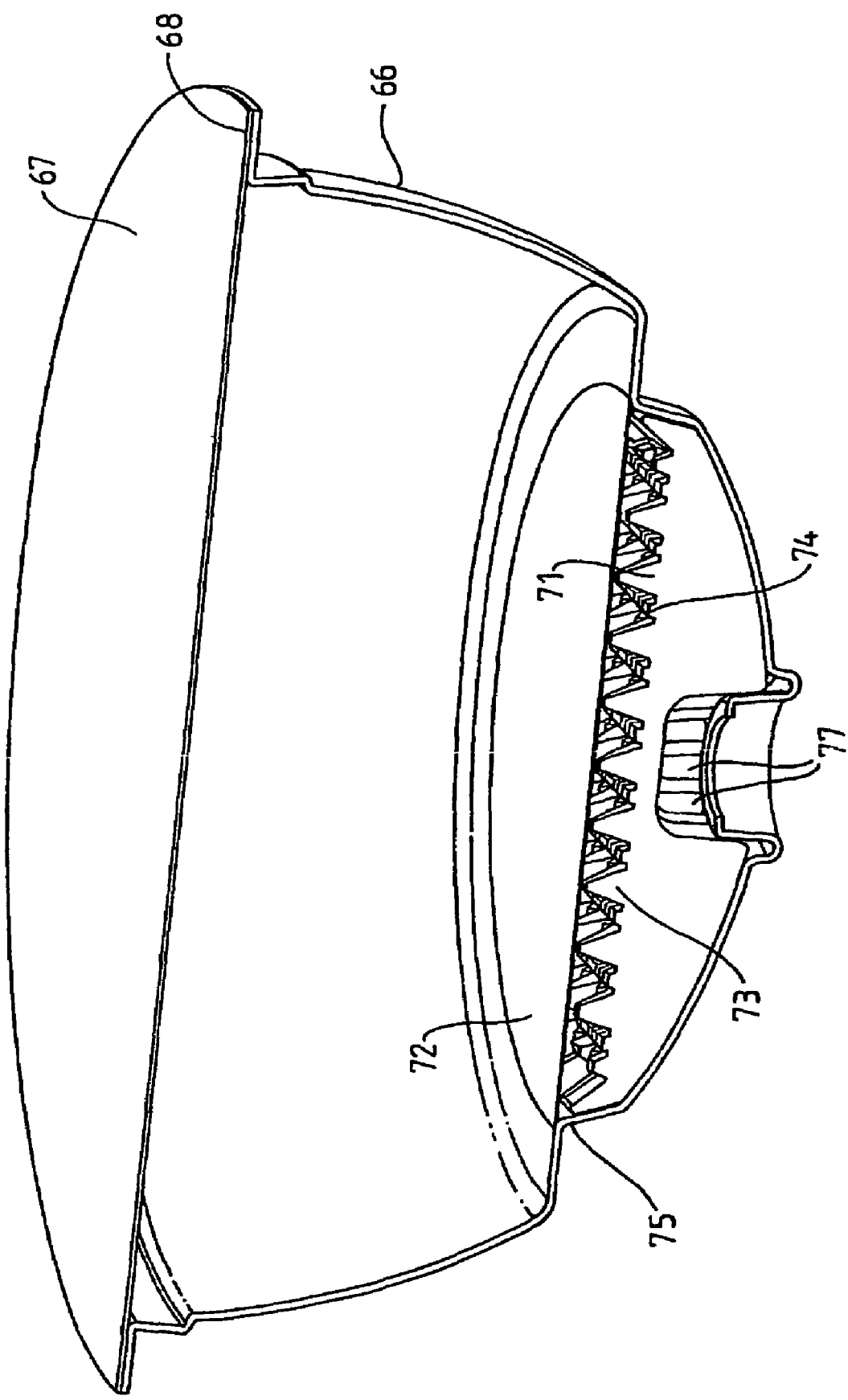
FIG. 7 is a perspective view of the capsule according to the previous figure.

FIGS. 6 and 7 show the capsule according to the invention in an alternative form of its fourth embodiment. This capsule comprises a cup (66) and a membrane (67) welded along a peripheral welding edge (68) to the periphery of the cup. The capsule contains a substance to be extracted (69). The means allowing opening is arranged in a housing (70) at the bottom of the cup. This means consists of an element (71) with opening means covered by a thin film (72).

The opening means are points (73) distributed over the entire surface of the element (71) and directed towards the thin film (72). These means may also be recessed and raised elements of a shape other than that of the points depicted. As in the preceding embodiments, the water is introduced via the membrane (67) and the rise in pressure will press the thin film (72) against the puncturing means in such a way as to tear the thin film and the beverage can thus flow out into a mug arranged beneath. The element (71) also has a filter function for this purpose and comprises a number of channels (74) for the passage of the beverage. The channels (74) are present at the surface of the elements (71) and thus separate the points (73) to form a beverage distribution network. The beverage flows along the channels and ends up at the periphery (75) of the element (71) where it flows to the inside (76) at the bottom of the cup (66). The openings (77) allow the beverage to run into the mug (not depicted) arranged beneath. The bottom (66) of the cup and the openings (77) together form the beverage collection and outflow means. The openings (77) are preferably made through the edges of a re-entrant tubular part of the cup that is delimited at its base by a small internal peripheral channel. Such a configuration allows controlled and less sudden flow and avoids liquid splashing out of the service region. As with FIG. 5, we are talking here about a four-component capsule, the four components being the cup, the element with the opening means, the membrane and the thin film. The cup is fabricated by thermoforming and the disc is fabricated by injection molding.

Figure 8:
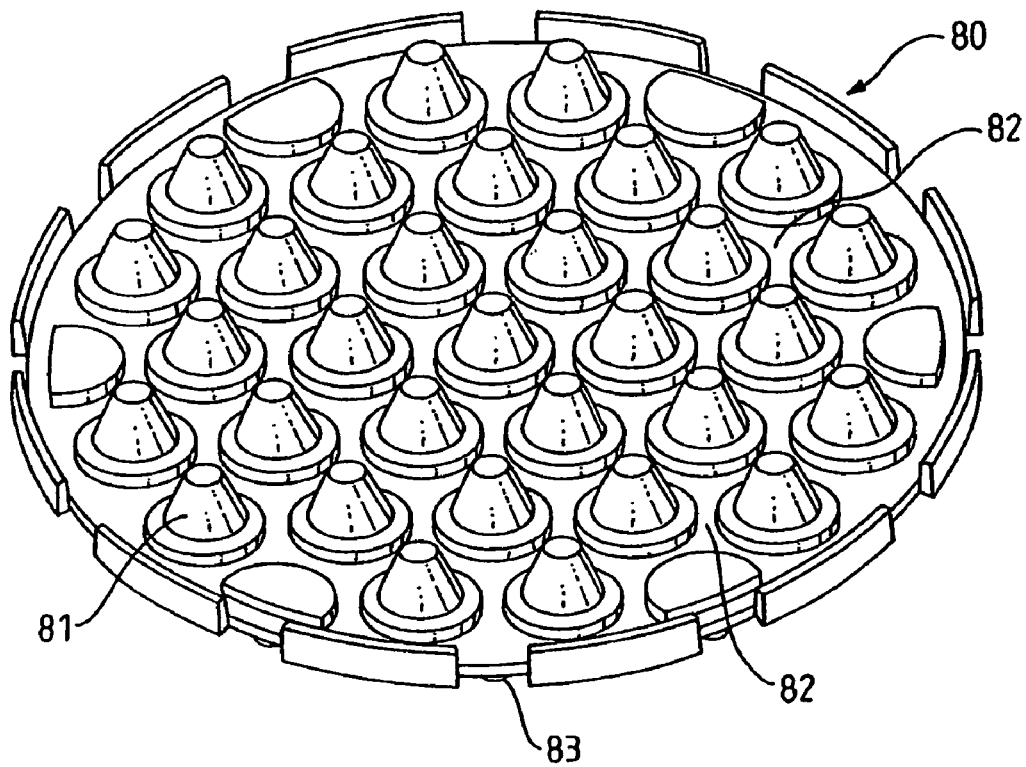
FIG. 8 is a perspective view of the means allowing opening of the capsule according to the second option.

FIG. 8 shows a perspective view of the means allowing the opening of the capsule according to the fourth embodiment. This means (80) is an injection-molded disc placed on the bottom of the cup. It comprises raised elements in the form of cone frustums (81) and spaces (82) between the raised elements. In the capsule, when the thin film is torn, the beverage flows along the spaces (82) towards the outside (83) of the disc. One might very well envisage the disc being at the bottom of the cup of FIGS. 6 and 7: the beverage flows over the inside (76) of the bottom of the cup (66).

Figure 9:
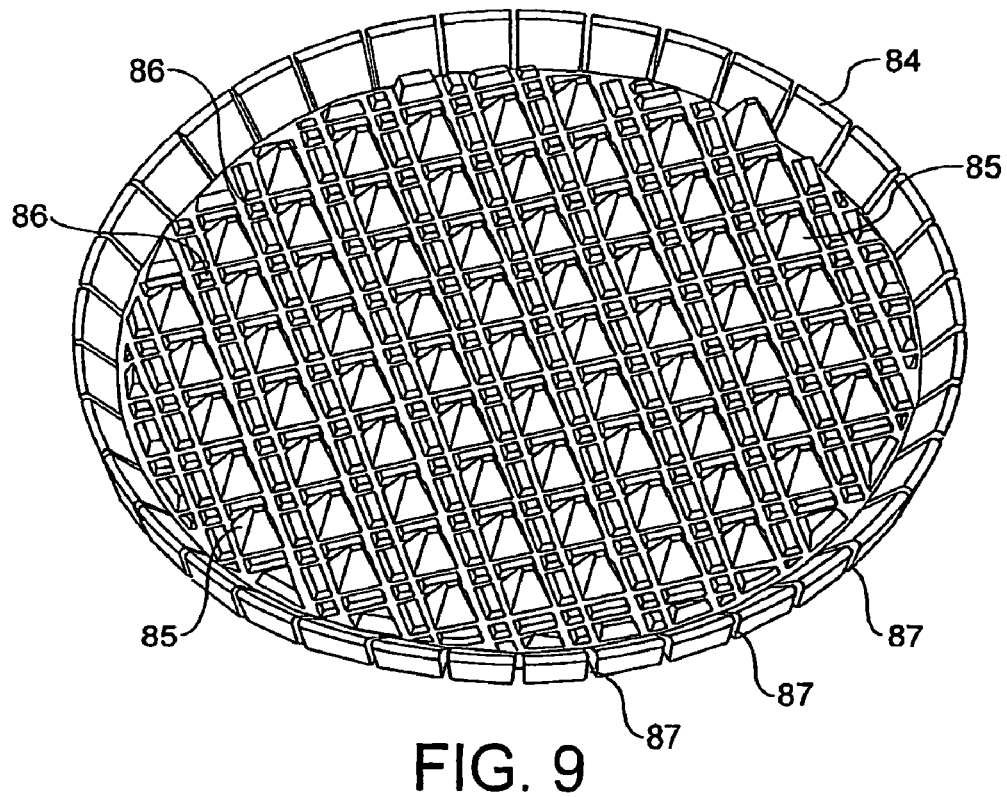
FIG. 9 is a perspective view of the means allowing opening of the capsule according to the second option.

FIG. 9 shows another embodiment of the means of opening the capsule. This is a disc (84) allowing the capsule to be opened. This disc (84) is an injection-molded wafer placed on the bottom of the cup. It comprises raised elements in the form of pyramids (85) and spaces (86) between the raised elements. In the capsule, when the thin film is torn, the beverage flows along the spaces (86) towards the outside (87) of the disc. It is very easy to envisage the disc being at the bottom of the cup of FIGS. 6 and 7; the beverage flows out over the inside (76) of the bottom of the cup (66).

Figure 10:
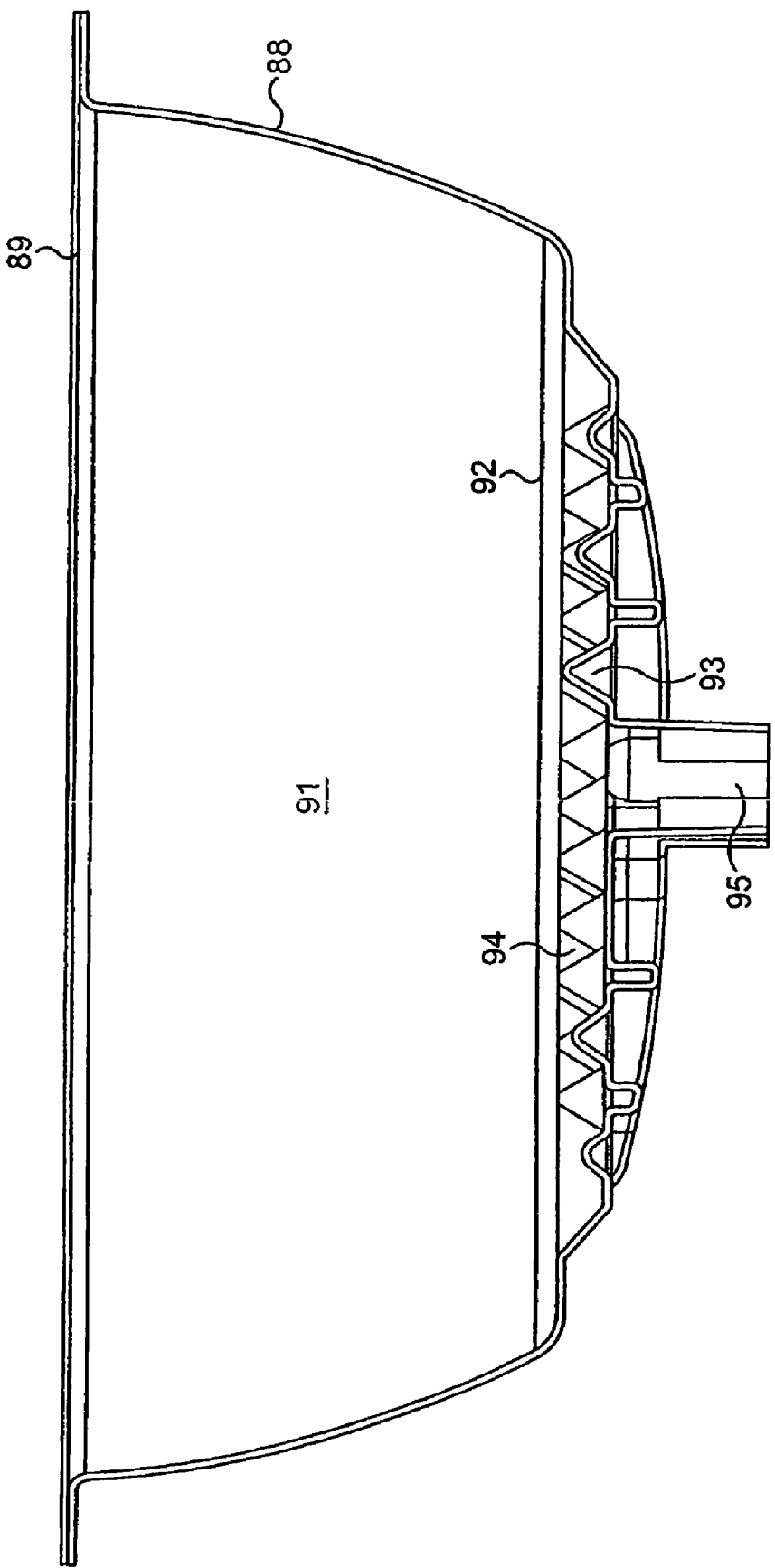
FIG. 10 is a schematic section view according to the fifth embodiment.
Figure 11:
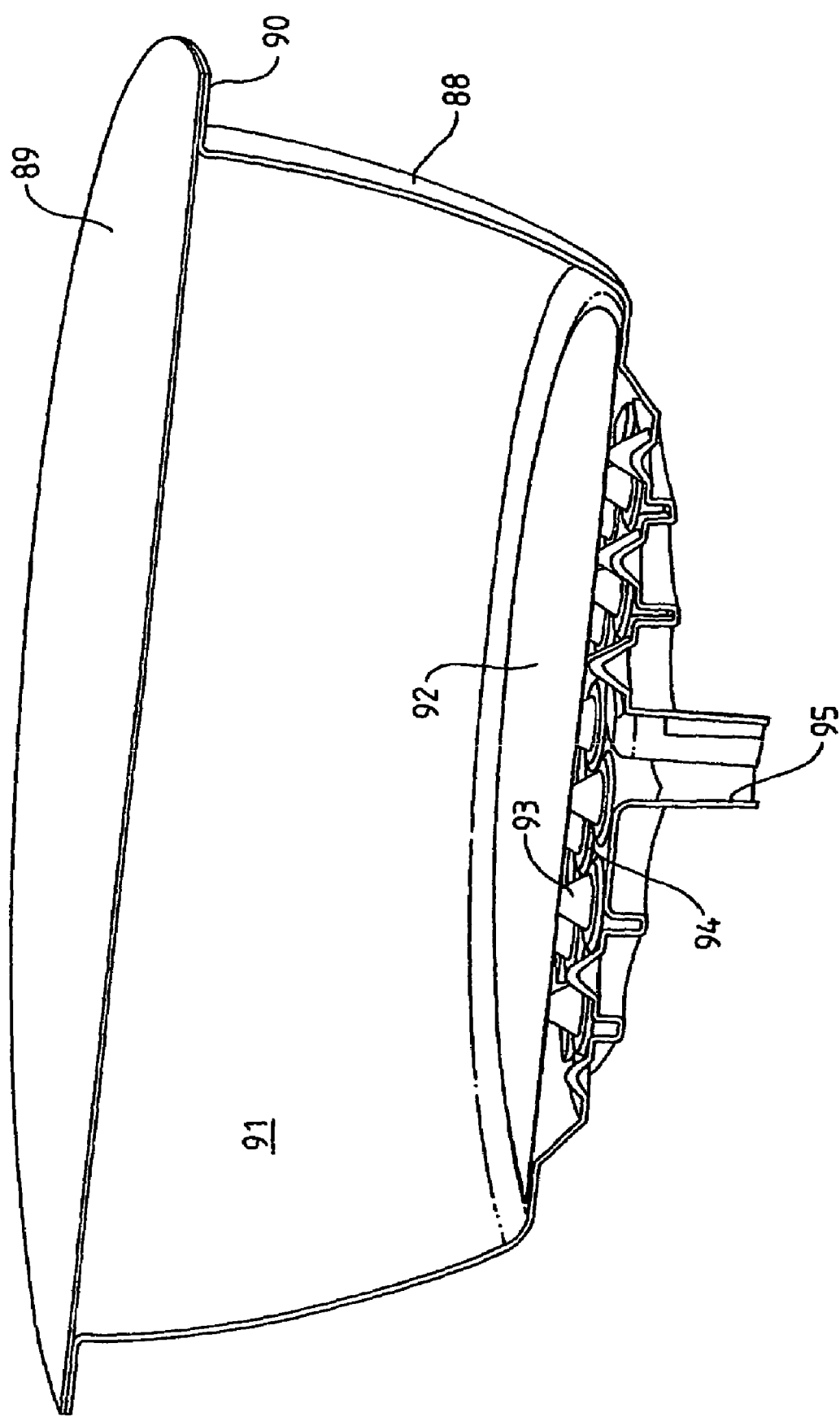
FIG. 11 is a perspective view of the capsule according to the previous figure.

FIGS. 10 and 11 show the capsule according to the invention in a fifth embodiment. In this case, we are talking about a three-component capsule. This capsule comprises a cup (88) and a membrane (89) welded along the peripheral weld line (90) onto the periphery of the cup. The capsule contains a substance to be extracted (91). The means allowing opening is in the bottom of the cup. This means is in the form of raised elements (93) and recessed elements (94) forming the bottom of the cup, the means being covered by a thin film (92). As in previous embodiments, the water is introduced via the membrane (89) and the rise in pressure will press the thin film (92) against the raised and recessed elements so as to tear the thin film and the beverage can thus flow out into a mug arranged beneath. The thin film (92) also has a filter function and the beverage flows in the recessed spaces (94). The beverage runs along the spaces and ends up on a tubular portion comprising a central opening (95) in the bottom of the cup (66). This opening (95) allows the beverage to run into the mug (not depicted) arranged beneath. As mentioned hereinabove, we are talking about a three-component capsule, these components being the cup, the membrane and the thin film. The cup is fabricated by thermoforming and makes it possible directly to obtain the means of opening the capsule, namely the raised and recessed elements.

Figure 12:
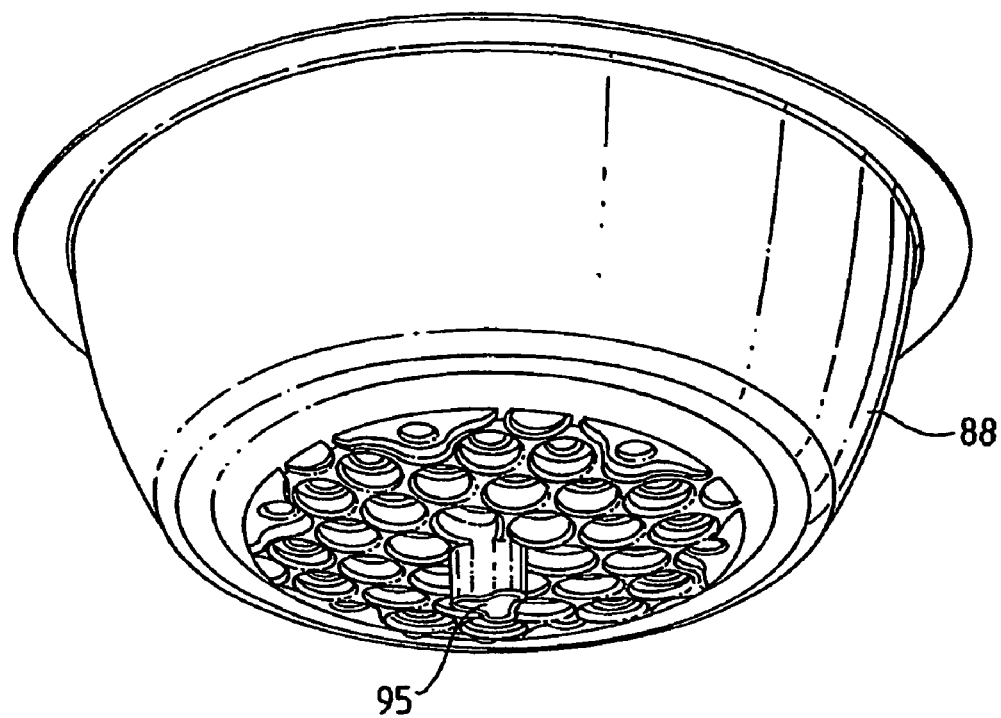
FIG. 12 is a perspective view of the cup from underneath.
Figure 13:
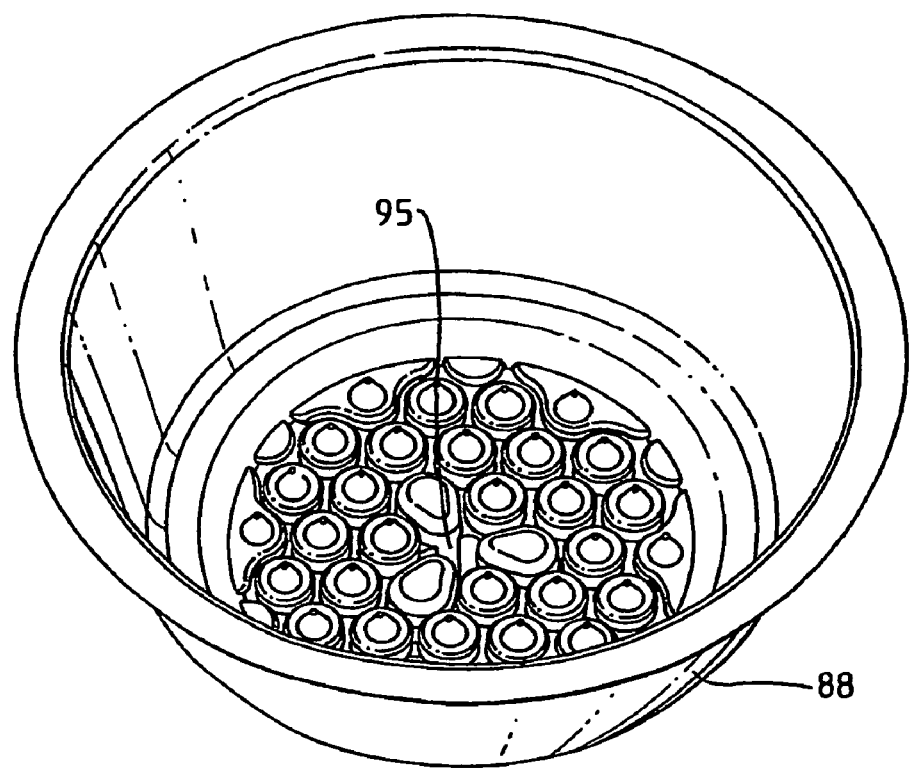
FIG. 13 is a perspective view of the cup from on top.

FIGS. 12 and 13 simply give perspective detections from beneath and from above of the cup (88) of FIGS. 10 and 11. The central opening (95) allowing the beverage to flow out at the time of extraction is clearly visible. This cup is thermoformed in a single piece using an appropriate thermoforming device.

Thereafter, the thin film is sealed onto the internal edges of the bottom of the cup, and the substance is filled, for example in an atmosphere of nitrogen or in some other atmosphere more or less free of oxygen and finally the membrane is sealed.

Figure 14:
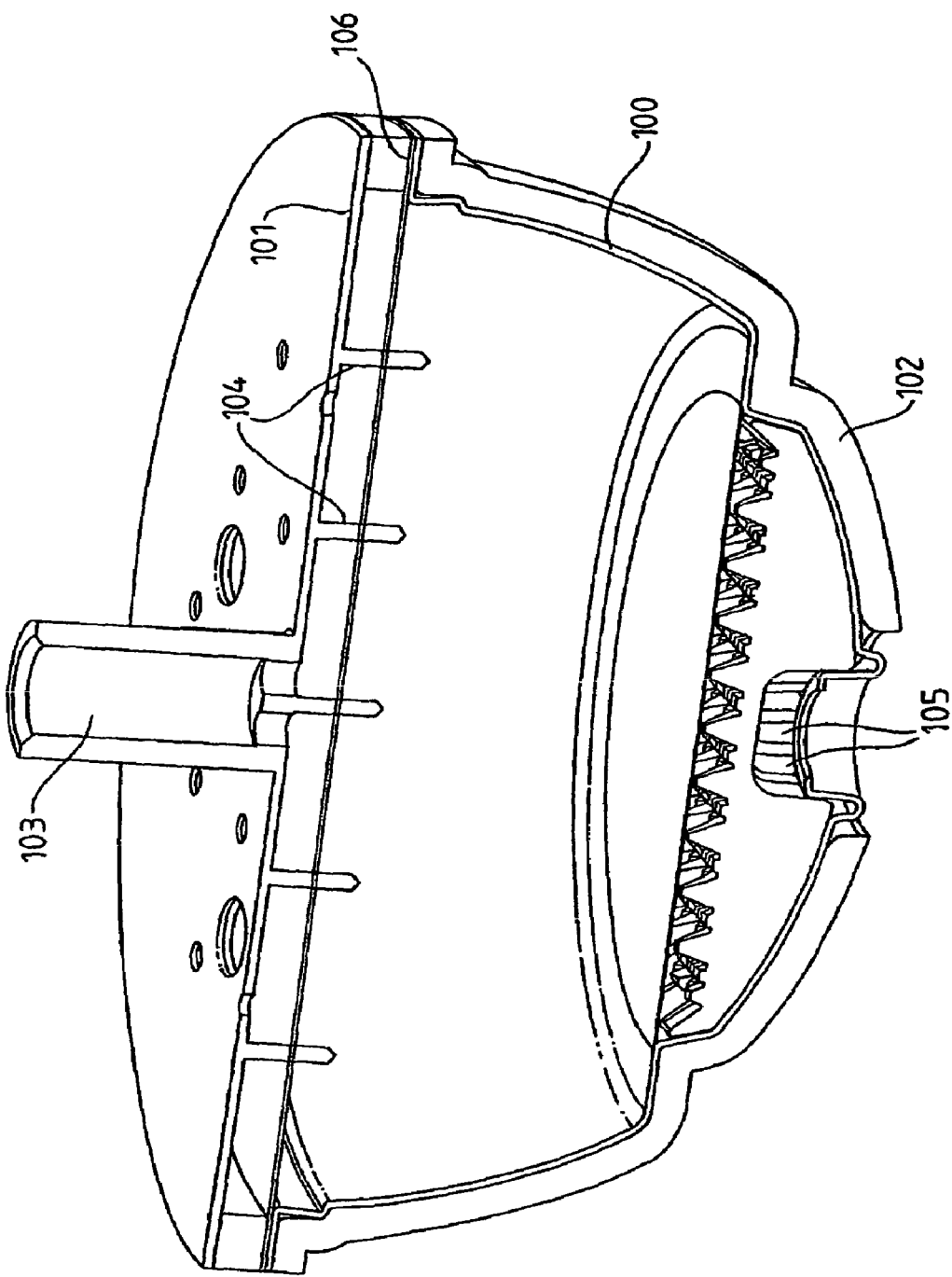
FIG. 14 is a schematic depiction of the capsule in its extraction system.

FIG. 14 schematically shows the capsule (100) according to the invention in its extraction system.

The capsule is trapped in elements (101) and (102) of the extraction system. The element (101) allows water to arrive on the top of the capsule via the duct (103) and the needles (104) perforate the top of the capsule.

Sealing is guaranteed by the seal (106). The support element (102) holds the capsule in place and at the time of its opening beverage runs through the outlet (105) into the mug (not depicted) placed beneath.

Figure 15:
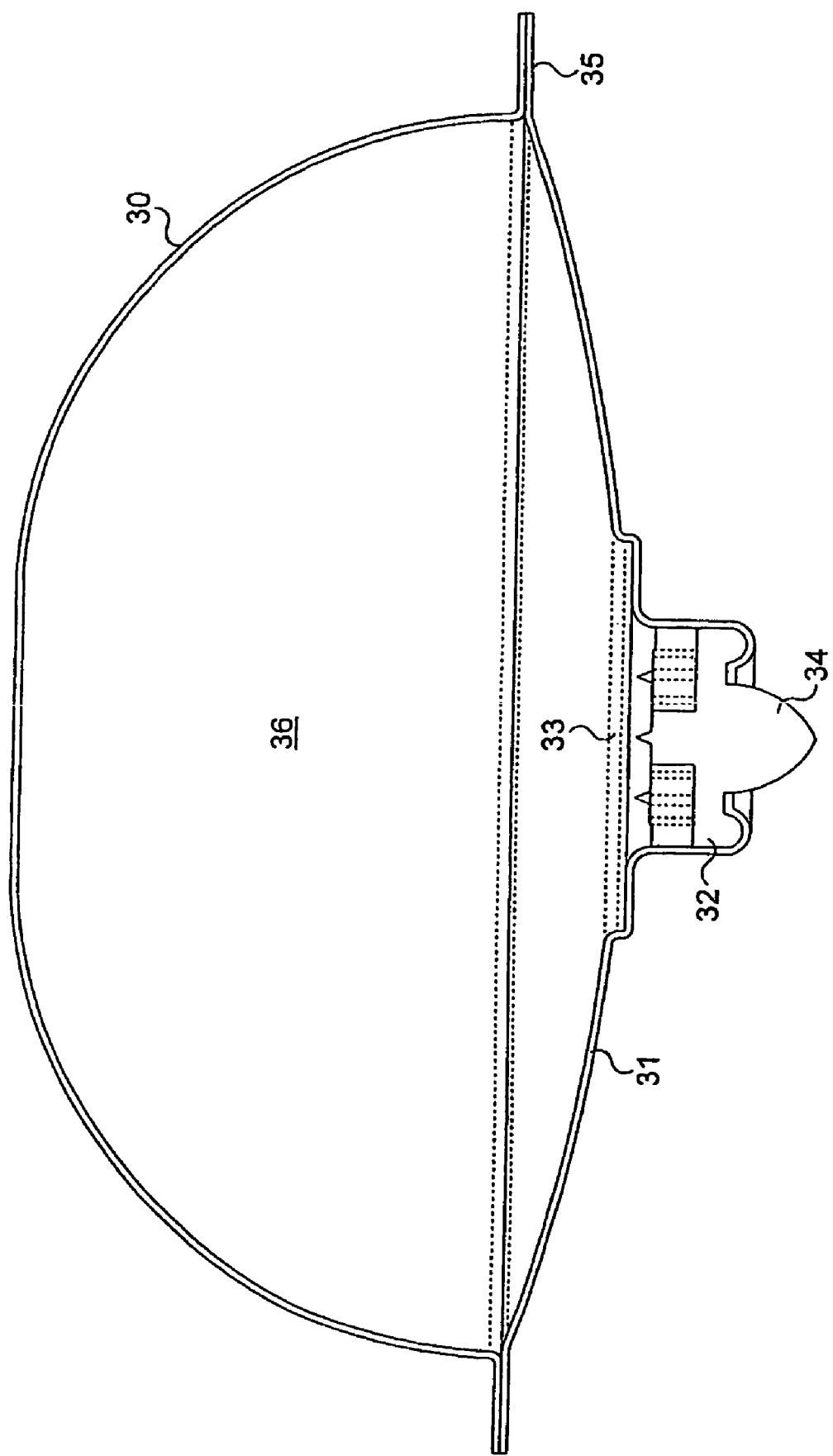
FIG. 15 is a schematic sectioned view of the capsule according to the sixth embodiment.

FIG. 15 shows the capsule in its sixth embodiment. By comparison with FIG. 5, the difference lies in the position of the opening system that is positioned in a housing of the membrane instead of being in a housing of the cup. The capsule comprises a cup (30) onto which a membrane (31) is welded along a weld line (35). The capsule contains a substance (36). The opening system comprises an element (32) with puncturing means covered by a thin film (33). As with the previous capsule, the water is injected from the top of the cup and the rise in pressure inside the capsule presses the thin film (33) against the puncturing means of the element (32) and the beverage flows out through the center (34) of the membrane.

Figure 16:
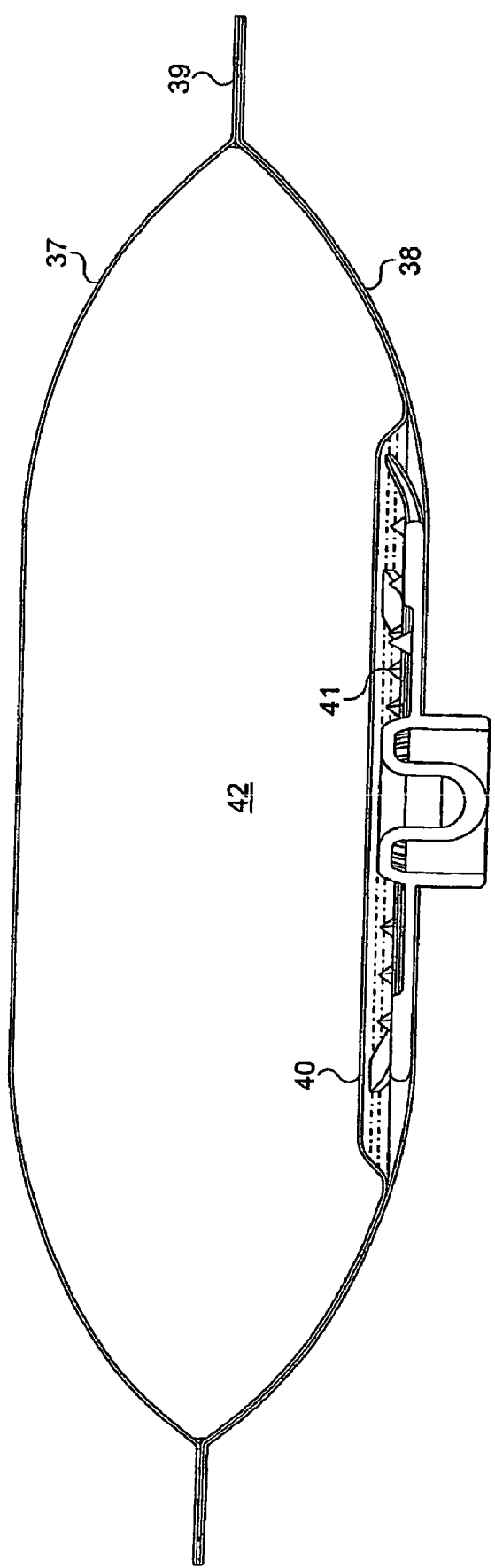
FIG. 16 is a schematic sectioned view of the capsule according to another form of the sixth embodiment.

FIG. 16 shows a capsule with two symmetric half-shells (37,38) welded along a weld line (39) and containing a substance to be extracted (42). The means allowing opening is arranged in the shell (38) and consists of a disc (41) with puncturing means covered by a thin film (40). As with the other capsules, the rise in pressure in the capsule pushes the thin film towards the puncturing means until the thin film tears. The beverage then runs into the mug arranged beneath.

Figure 17:
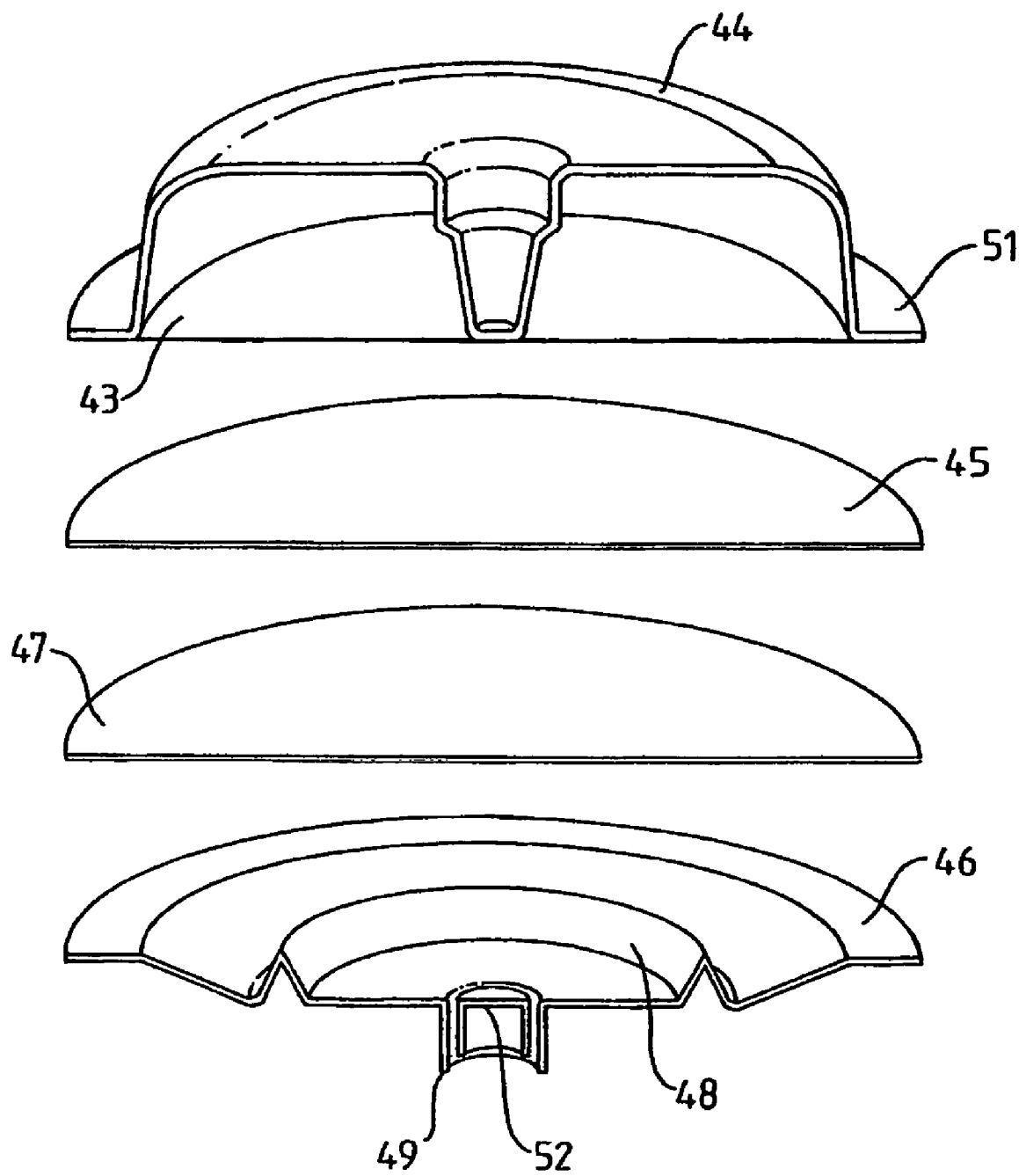
FIG. 17 is an exploded view of the capsule according to the seventh embodiment.

FIG. 17 shows the capsule in a last embodiment, in an exploded view. It comprises a cup (44) onto which a disc (46) is welded along the weld line (51). The capsule contains a substance to be extracted (43). The means allowing opening comprises a thin film (45) welded between the disc and the cup. The disc comprises a raised annular element (48) and an annular channel (49) for the outflow of the beverage. This capsule is perfectly suitable if the substance to be extracted is instant coffee. However, if the substance to be extracted is roasted ground coffee, then a filter (47) needs to be added to the capsule according to the invention, the filter being arranged under the thin film and thus serving to hold back the coffee grounds.

The procedure is then as follows: the capsule is introduced into an extraction device. This device comprises a means for opening the capsule at (50), the water runs into the capsule and the rise in pressure will press the thin film (45) against the annular element (48).

The thin film tears and the beverage flows out via the channel (49) into the mug arranged beneath. In this case, a support element (see FIG. 14) is always needed for the disc, the support element forming part of the extraction system.

The terms "puncture" and "puncturing" relate to one or more means whose function is to make an opening against a solid, flexible or otherwise, weakened or partially open, portion not only by puncturing in the strict sense of the term but also by any equivalent means such as cutting or breaking.

The term "beverage" covers any type of beverage that can be prepared from a soluble or partially soluble substance or substance that can be percolated and also encompasses preparations of the soup, broth or other similar food preparation types.

Also, the term "mug" is used herein as a general designation of a container for receiving the extracted beverage. This term would include cups, glasses or other containers that are suitable for this purpose.

Abbreviations: PET=polyester; PP=polypropylene; EVOH=a copolymer of ethylene and vinyl alcohol; PVDC=polyvinylidene chloride; PE=polyethylene; and PA=polyamide.

What is claimed is:

1. A capsule containing a substance for the preparation of a beverage that is designed to be extracted by injection of a fluid under pressure, the capsule comprising a single, unitary device including several elements comprising:
   a chamber containing the substance, the chamber being closed prior to an injection of the fluid into the chamber, wherein the substance is in contact with at least a portion of an outer periphery of the capsule prior to the injection of the fluid into the chamber;
   a first puncturable wall of the chamber for allowing the fluid to be injected into the chamber, wherein the first puncturable wall comprises at least a portion of the outer periphery of the capsule and wherein the first puncturable wall is welded to a remaining portion of the outer periphery of the capsule;
   a second puncturable wall forming a retaining wall for the substance; and
   an opening device comprising at least one puncturing element, wherein the opening device is contained within the outer periphery of the capsule, wherein the retaining wall is made of a flexible membrane and the at least one puncturing element is configured to face the flexible membrane, and wherein opening of the capsule is achieved by a relative engagement of the at least one puncturing element with the retaining wall, with the relative engagement being performed under an effect of a rise in pressure of the fluid in the chamber.

2. The capsule of claim 1, wherein the closed chamber houses the at least one puncturing element and the at least one puncturing element is urged against the flexible membrane due to the rise in pressure of the fluid in the chamber.

3. The capsule of claim 1, wherein the at least one puncturing element is housed outside the closed chamber and the flexible membrane is moved against the at least one puncturing element by the rise in pressure in the chamber.

4. The capsule of claim 3, wherein the flexible membrane is a thin film that can be punctured by the at least one puncturing element.

5. The capsule of claim 4, wherein the thin film is made of a material selected from the group consisting of aluminum, a plastic/plastic composite, an aluminum/plastic/paper composite, a single-layer plastic film and multi-layer plastic film.

6. The capsule of claim 1, wherein the closed chamber comprises a cup and a membrane welded to the periphery of the cup and the opening device is arranged in the bottom of the cup and comprises a disc having puncturing means for puncturing the bottom of the cup and the membrane due to a rise in pressure inside the chamber.

7. The capsule of claim 1, wherein the closed chamber comprises a cup and a membrane welded to the periphery of the cup and the opening device is arranged on the membrane and is an element having puncturing means for puncturing the membrane due to a rise in pressure inside the chamber.

8. The capsule of claim 7, wherein the ratio of the diameter of the opening device to the diameter of the capsule is between 1:6 and 1:1.

9. The capsule of claim 1, wherein the closed chamber comprises a cup with a rim, a bottom having an opening for the outflow of the beverage, and a membrane welded to the periphery of the rim of the cup, with the opening device arranged in the cup and including a plurality of puncturing elements covered by a thin film, with the thin film being torn by the puncturing elements due to a rise in pressure inside of the closed chamber.

10. The capsule of claim 1, wherein the closed chamber comprises a cup with a rim, a bottom having an opening for the outflow of the beverage, and a membrane welded to the periphery of the rim of the cup, with the at least one puncturing element comprising recessed and raised puncturing elements arranged at the bottom of the cup and being covered by a thin film, with the thin film being torn by the recessed and raised puncturing elements due to a rise in pressure inside of the chamber.

11. The capsule of claim 10, wherein the opening device comprises a disc or an element with a flat face with the opening device having a curved face pressing against the bottom of the cup.

12. The capsule of claim 10, wherein the opening device comprises recessed and raised puncturing elements on the bottom of the cup, the bottom including an opening for the outflow of the beverage.

13. The capsule of claim 1, wherein the closed chamber comprises a cup, a membrane welded to the periphery of the cup and an opening for the outflow of the beverage, with the opening device arranged in a housing at the center of the membrane and including an element having one or more puncturing element(s) covered by a thin film, with the thin film being torn by the one or more puncturing elements due to a rise in pressure in the chamber.

14. The capsule of claim 1, wherein the closed chamber comprises two welded half-shells, one having an opening for the outflow of the beverage, and with the opening device arranged in the half-shell with the opening and including a disc having one or more puncturing elements covered by a thin film, with the thin film being torn by the one or more puncturing elements due to a rise in pressure in the chamber.

15. The capsule of claim 14, which further comprises a filter provided between the thin film and the disc.

16. The capsule of claim 15, wherein the disc comprises a discontinuous annular element and the disc comprises ribs directed towards the center of the disc.

17. The capsule of claim 15, wherein the filter is made of a material selected from the group consisting of filter paper, woven fibers and nonwoven fibers.

18. The capsule of claim 14, wherein the one or more puncturing elements have a continuous or discontinuous annular configuration.

19. The capsule of claim 1, wherein the closed chamber comprises a cup and a disc welded to the periphery of the cup, the cup having an opening for the outflow of the beverage and the opening device comprising a thin film welded between the disc and the cup and one or more raised puncturing elements on the disc collaborating with the thin film to allow the opening of the thin film due to a rise in pressure in the chamber.

20. The capsule of claim 1, wherein the closed chamber is made of one or more materials selected from the group consisting of aluminum, an aluminum/plastic composite, an aluminum/plastic/paper composite, a single layer plastic film and a multilayer plastic film.

21. The capsule of claim 20, wherein the closed chamber is made of a plastic selected from the group consisting of EVOH, PVDC, PP, PE, and PA, either in a single layer or a multilayer.

22. The capsule of claim 1, wherein the at least one puncturing element includes a point, a blade, a knife, or a needle.

23. The capsule of claim 1, wherein the substance for the preparation of a beverage is chosen from the group consisting of roasted ground coffee, tea, instant coffee, a mixture of roasted ground coffee and instant coffee, a chocolate product and any other dehydrated edible substance.

24. A process for the preparation of various beverages in an extraction machine, the process comprising:
  providing a capsule comprising a single, unitary device including several elements comprising a chamber containing a substance, the chamber being closed prior to an injection of a fluid into the chamber and the substance being in contact with at least a portion of an outer periphery of the capsule prior to the injection of the fluid into the chamber, and an opening device, wherein the opening device is contained within the outer periphery of the capsule; and
  introducing the fluid under pressure from an injection device of an extraction machine into the chamber to form a beverage, wherein once the pressure inside the chamber reaches a certain level, the opening device is activated to open the capsule and release the beverage and wherein the liquid of the beverage does not come into contact with the extraction machine and the capsule is supported from beneath by an element of the extraction machine.

25. A method of preparing a beverage from a capsule containing a beverage substance in a closed chamber, the method comprising:
  providing a capsule comprising a single, unitary device including several elements comprising
    a chamber containing the beverage substance, the chamber being closed prior to an injection of a fluid into the chamber, wherein the substance is in contact with at least a portion of an outer periphery of the capsule prior to the injection of the fluid into the chamber,
    a first puncturable wall of the chamber for allowing the fluid to be injected into the chamber, wherein the first puncturable wall comprises at least a portion of an outer periphery of the capsule and wherein the first puncturable wall is welded to a remaining portion of the outer periphery of the capsule,
    a second puncturable wall forming a retaining wall for the substance, and
    an opening device comprising at least one puncturing element, wherein the opening device is contained within the outer periphery of the capsule; and introducing the fluid under pressure into the capsule to form a beverage, wherein once the pressure inside the capsule reaches a certain level, the opening device is activated to open the capsule and release the beverage.

26. A method according to claim 25, wherein the opening device is activated by the effect of the internal pressure which becomes established within the closed chamber due to an injection of the fluid therein.

27. A capsule containing a substance for the preparation of a beverage that is designed to be extracted by injection of a fluid under pressure, the capsule comprising a single, unitary device including several elements comprising:
  a chamber containing the substance, the chamber being closed prior to an injection of the fluid into the chamber, wherein the substance is in contact with at least a portion of an outer periphery of the capsule prior to the injection of the fluid into the chamber;
  a first puncturable wall of the chamber for allowing the fluid to be injected into the chamber, wherein the first puncturable wall comprises at least a portion of the outer periphery of the capsule and wherein the first puncturable wall is welded to a remaining portion of the outer periphery of the capsule;
  a second puncturable wall forming a retaining wall for the substance; and
  an opening device comprising at least one puncturing element, wherein the opening device is contained within the outer periphery of the capsule, wherein the closed chamber comprises two welded half-shells and the opening device comprises a rod arranged between the shells, the rod comprising at least one opening for the entry of the fluid into the closed chamber and a pointed shape for puncturing the weld between the two shells, the pointed shape further comprising a filter.

* * * * *